United States Patent [19]
Albertson et al.

[11] Patent Number: 4,901,654
[45] Date of Patent: Feb. 20, 1990

[54] DEODORIZATION AND CLEANING OF MEDIUM TEMPERATURE WET OFF-GASES DERIVED FROM BURNING OF WET WASTE SLUDGE

[76] Inventors: Orris E. Albertson, 1915 Wasatch Dr., Salt Lake City, Utah 84108; Allen Baturay, 4005 Aldie Rd., Catharpen, Va. 22018

[21] Appl. No.: 219,721

[22] Filed: Jul. 15, 1988

[51] Int. Cl.⁴ .............................................. F23G 7/04
[52] U.S. Cl. .................................. 110/346; 110/212; 110/238; 110/229; 110/214; 110/215
[58] Field of Search ............... 110/210, 211, 212, 213, 110/224, 225, 238, 214, 215, 229, 346

[56] References Cited

U.S. PATENT DOCUMENTS 2,655,883 10/1953 Martin ................................. 110/225
2,744,477 5/1956 Hartley et al. ...................... 110/225
4,050,389 9/1977 von Dreusche, Jr. ............... 110/225
4,215,637 8/1980 Lombana ........................... 110/225

OTHER PUBLICATIONS

*Bulletin: NGK Sludge Incinerating Plant*, NGk Insulators, Inc., Apr. 1987.
*Combustion and Incineration Process*, Walter R. Niessen, Marcel Dekker, Inc., NY, 1978, pp. 271-296.
*Air Pollution Control at Resource Recovery Facilities*, California Air Resources Board, May 24, 1984.

Primary Examiner—Edward G. Favors
Assistant Examiner—Denise L. Ferensic
Attorney, Agent, or Firm—Robert R. Finch

[57] ABSTRACT

Medium temperature (500° F.–1100° F.) wet off-gases from the final drying zone of counterflow incineration of waste sludge are scrubbed and cooled before heating to final high temperature in an afterburner and the resulting hot dry gases are used to preheat the scrubbed and cooled gases prior to entry of said gases into the afterburner.

6 Claims, 4 Drawing Sheets

DEODORIZATION AND CLEANING OF MEDIUM TEMPERATURE WET OFF-GASES DERIVED FROM BURNING OF WET WASTE SLUDGE

FIELD OF THE INVENTION

This invention relates generally to disposal of waste sludge such as the primarily organic municipal sewage sludge and sludges derived from treating industrial wastes. More particularly, the invention is directed to disposing of such sludges by drying and burning in a furnace, such as a multiple hearth furnace, rotary kiln or electric furnace, through which the sludge and hot gases pass counter-currently and there are yielded as separate products dirty, wet off-gases and residual ash. As used in this specification, unless the context demands otherwise, furnace, counter-flow furnace and/or counter-current furnace refer to a furnace of the foregoing type.

Specifically, the invention is directed to improved ways and means for deodorizing and cleaning off-gases from the furnace to the end that the entire disposal process is rendered more efficient.

BACKGROUND

A major worldwide problem is the disposal of waste. Typically, wastewater is treated to separate the water, which is reclaimed, from the solids which are disposed of, often by drying and burning. In the United States of America, about 25% of municipal sludge is disposed of by incineration.

Waste sludges produced from wastewater treatment are typically dewatered to 16 to 25% total solids with belt presses or centrifuges and 26-35% with filter presses. The resulting wet cake is then dried and burned to yield ash and gaseous products which must also be completely oxidized (burned) and cleaned.

While sewage sludge has a heat content similar to a low ranked coal or lignite, the bulk of its thermal energy is derived from distilling the volatile content to gases (vapors) which are then combusted. (This is much different from higher order coal where the majority of the energy is stored as fixed carbon.) The distilled gases, such as methane and ethane, will be combusted to $CO_2$ and $H_2O$ when there is adequate available oxygen and the ignition temperature is maintained with sufficient detention time. The required ignition temperature can exceed 1400° F. and contact up to 3 seconds may be required. Even at ignition temperature, if there is insufficient oxygen, partial combustion will occur which can yield carbon monoxide, soot (carbon) and gaseous hydrocarbons. Additional contaminants include various volatile components distilled from the drying sludges the quantity of which varies in response to changes of locations of the drying and combustion hearths. As a result of these inputs, stack gases analyzed by EPA test procedures may identify the following contaminants:

Hydrocarbons—small molecular gases such as methane and ethane.

Products of Incomplete Combustion—intermediate compounds such as acrylonitrile, benzene, and vinyl chloride.

Distillates—larger volatile compounds which are water soluble and are trapped by the back-catch in the test procedure such as alcohols, acetates, and condensible hydrocarbons, as well as more complex organics.

Particulates—the 'dust' loading in the stack which is not removed by the scrubbers. Particulates (soot) increase when partial combustion occurs.

Air pollution standards are becoming more restrictive and in some areas non-attainment of existing standards can pose serious problems even for the highest quality exhaust gases. Tighter standards must be anticipated in the implementation of any changes to improve performance of furnaces, many of which are already having difficulty meeting existing standards. It has often been necessary to raise the temperature of gases to 1400° F.–1500° F. and reduce the sludge loading by 30% to meet air pollution standards. Some states have already imposed minimum exhaust temperatures (after last contact with sludge) of 1200° F. to 1400° F.; and federal and state laws under consideration may require a minimum afterburner gas temperature as high as 1700° F.

In prior sludge disposal practice, the off-gases from the cake drying zone of the furnace contain entrained particulates, are usually wet due to a content of large quantities of water vapor, and contain undesirable volatile impurities. Before the gases can be discharged to atmosphere the particulates and other contaminants must be removed.

The only known effective method of eliminating organic and other combustibles from off-gases in high temperature retention in the presence of adequate oxygen. A retention time of 1 to 3 seconds and a temperature in the range of 1400° F.–1700° F. are normal requirements with the shorter detention time corresponding to higher temperatures. Exact operating conditions will depend on the specific requirements, waste constituents and/or regulatory statutes.

In accordance with prior practice, off-gases derived from drying and burning sludge in a counter-flow furnace are deodorized and cleaned by subjecting them to combustion in a so-called afterburner wherein the combustible gas content, augmented as needed by auxiliary fuel and combustion air, is burned to heat the gases sufficiently to effect combustion of the contaminants. To meet emission standards, this often requires heating the gases to 1400° F.–1500° F. or higher. Thereafter, the gases are scrubbed and otherwise treated to remove particulates and moisture and to cool them for eventual release to the atmosphere.

In some cases, the afterburner is established in the furnace itself adjacent the gas-outlet sludge-inlet zone, (the top hearth of a multiple hearth furnace), while in other cases a completely separate unit is utilized. In either case, the dirty, wet off-gases, which are already at a temperature of at least 500° F., must be further heated sufficiently to ignite and burn their combustible content. This requires heating the off-gases to 1400° F. to 1500° F. and takes considerable added fuel because it is necessary to heat not only the contaminants to be burned, but also the moisture, fuel combustion air and the excess air used in the furnace. Excess air is stated as a percentage of stoichiometric air. Stoichiometric air is the amount required to fully oxidize organic solids containing carbon, hydrogen, oxygen, nitrogen and sulfur in the sludge and fuel supplied to the furnace. Excess air is commonly equal to 100% to 125% of stoichiometric air.

Although the existing systems have operated for many years, most of them will require modifications to enable continued operation under more restrictive air pollution codes. As noted, the only known method of meeting air pollution control criteria is high temperature combustion. High temperature combustion is expensive. It requires a lot of fuel and suffers from the inherent disadvantage that the additional fuel uses up a lot of air normally used in sludge combustion thereby reducing the furnace's sludge handling capacity, sometimes by as much as 30%–40%. The capacity loss can be overcome by extensive modifications to the furnace air supply and scrubbing systems, but the high operating expense of extra fuel will remain as will the expense of supplying and handling greater volumes of air and resulting off-gases.

A major cost factor of prior systems is afterburning of the off-gases containing the products of sludge drying and combustion. These gases, which are wet and loaded with particulates and other contaminants, cannot be used in heat exchangers because they would quickly foul the equipment and create a fire hazard. Because of this, the off-gases are subjected to afterburning as they are (wet and dirty) then immediately scrubbed and cooled; and none of the heat content is available to preheat the off-gases.

A related problem inherent in existing systems from the need to prepare (heat) the off-gases for immediate afterburning. The economics of afterburning often require that the furnace temperature be so high as to result in undesired 'fuming' of heavy metals in the furnace with consequent difficult problems of heavy metal removal.

In summary then, the wet, dirty off-gases from the furnace contain moisture, particulates, condensibles and extra gas volume which require considerable fuel to reach combustion temperatures in the afterburner, but which make no contribution to the cleaning or deodorizing operation.

From the foregoing, it is evident that in the current systems of sludge disposal, the wet, dirty, medium-temperature off-gases are the real culprits working against improvement in the system. This invention addresses the problem by conducting the sludge cake drying and burning in the furnace in a manner to yield dirty off-gases which are then handled in a unique manner before they are subjected to increased oxidative temperatures in the afterburner.

SUMMARY OF INVENTION

It is the primary object of this invention to provide improved ways and means for the disposal of waste sludges by combustion with subsequent cleaning and deodorizing of gaseous products of drying and combustion.

Another object is provision of ways and means achieving the foregoing object in which the off-gases from the drying zone of a sludge drying and burning furnace are treated to yield conditioned off-gases that are significantly reduced volume, moisture content and contaminant content hence amenable to cleaning and deodorizing in an afterburner with reduced fuel.

Yet another object is the provision of ways and means achieving the foregoing objects in which the conditioned off-gases prior to afterburning as well as the hot clean gases discharged from the afterburner are suitable for use in heat exchangers such as the regenerative type heat exchangers employed in power industries which achieve up to 90% effectiveness in heat transfer.

A further object is provision of ways and means achieving the foregoing objects in which the final increment of super heating gases for deodorizing and cleaning is enabled with only nominal additional fuel.

A related object is the provision, in sludge disposal systems of the type under discussion, of ways and means for handling the wet, dirty, medium-temperature off-gases that enable modification of the drying and combustion of the sludge in the furnace and, in turn, the afterburning.

Another very important object is the provision of ways and means achieving the foregoing objects and which may be readily incorporated into existing systems to enable attainment of all features of this invention.

An even further object is the provision of ways and means achieving the foregoing objects and enabling operation of a counter-flow furnace under conditions which limit undesirable fuming therein of heavy metals.

The foregoing and possibly other objects of the invention are predicated on the discovery that significant fuel economy is achieved if the wet, dirty medium-temperature off-gases from a sludge burning unit, such as a multiple hearth furnace or rotary kiln, through which gases and sludge pass counter-currently, are conditioned, prior to any further heating, by cooling and washing in a water scrubber and only then reheating the resulting conditioned off-gases as needed for final cleaning and deodorizing. Additionally, other phases of the overall sludge disposal operation will benefit as herein described.

In achieving its objects, the invention starts at the same place as prior practice, namely, with the wet, dirty off-gases derived from the sludge drying zone of the furnace which gases are already at a so-called medium temperature in the range from 500° F.–1100° F. It also ends at the same place namely, with clean, cool gases processed for safe release to the atmosphere. Both the invention and prior practice employ afterburning to heat the gases to a higher temperature of at least 1400° F. to effect burning of contaminants. In this step, prior practice follows the logical step of simply adding more heat (fuel) to the gases which are already above 500° F. to heat them to the required higher temperature. In contrast, the method of the invention requires the very illogical step of cooling the medium temperature off-gases from above 500° F. clear down to an 80° F.–120° F. range and only thereafter reheating the gases to a final temperature of at least 1400° F.–1700° F. As will be apparent from this specification, the foregoing initial cooling and cleaning of the off-gases reduced fuel requirements by altering the make-up of the off-gases which also enables use of high efficiency heat exchangers. Further, it enables beneficial changes in the furnace operation.

According to the invention, the initial cooling and cleaning yields conditioned off-gases that are clean and have been cooled to 80° F.–120° F. are produced. The washing will have removed the particulates while the cooling will have removed by condensation and separation, most moisture and other condensible volatile gases. Accordingly, the subsequent afterburner fuel requirements are markedly reduced because there is now virtually no water vapor to heat and high efficiency heat recovery devices can be employed.

The characteristics of the conditioned off-gases, that is, cool, dry and particulates-free, enables them to be preheated by indirect heat exchange contact with hot afterburner discharge gases. This is the key feature of this invention. It results in great fuel economy and enables achievement of other objects. In contrast, the wet, dirty off-gases furnished to the afterburner in accordance with prior practice would quickly foul heat exchangers and even present a fire hazard hence, cannot be used therein.

The cooling and cleaning of the off-gases before entry to the afterburner makes is possible to alter furnace operation in a manner to effect even further, but less obvious, afterburner fuel economy. For instance, it is no longer necessary to add excess air to the furnace as was previously done. By reducing the air to the furnace, the volume of resulting off-gases is correspondingly reduced thus further lowering afterburner fuel requirements. In fact, with a proper sludge, the furnace could be run so the off-gases provide a reducing atmosphere. In such a case the gases, after cooling and scrubbing, will have a correspondingly higher BTU content to act as fuel in the afterburner thereby further decreasing auxiliary fuel requirements.

Many of the advantages to be achieved by the invention and the manner of achieving its objects will be more apparent as this specification proceeds. In brief, however, the features of advantage available through use of the invention include:

1. The furnace can be operated at higher throughput, as much as 30% higher.
2. The furnace does not have to be closely controlled to minimize emissions.
3. The furnace can be operated at lower excess air, further increasing capacity and efficiency.
4. The furnace can be operated at a lower temperature to avoid $NO_x$ production and the fuming of heavy metals and resulting hard-to-handle contamination of the gases.
5. The heat content of the furnace cooling air can be better utilized to reduce fuel costs.
6. Fuel consumption for high temperature deodorization can be reduced by 75-90%.
7. There is no added fuel cost to go from 1400° F. to 1700° F. final combustion temperature.
8. Equipment duty is less severe thereby reducing maintainance and replacement costs.
9. Since the off-gases are thermally oxidized after wet scrubbing, volatiles, such as chloroform, stripped from the scrubbing water are completely destroyed.
10. The clean stack gases will not result in any visual pollution such as a steam plume.

The advantages of operation of a system embodying the invention over operation of a conventional system is readily appreciated by comparing the design parameters of a system designed to practice the invention with the design parameters of an actual operating system designed for prior practice. Except for the heat exchanger and separate afterburner, the system embodying the invention is designed on the basis of the same equipment as the existing system. The furnace is a 25'-9" OD seven hearth furnace (2,674 ft²) with a design capacity of 22,000 lb/hr of cake at a solids content of 18.6% total solids. The furnace was originally designed to operate at up to 1400° F. The top hearth could be a sludge dryer at 800° F., or an afterburner at up to 1400° F. provided its sludge capacity was forfeited.

As modified for the invention, the top hearth of the furnace is used only for sludge drying. The new system uses the existing washer-cooler scrubber immediately following the furnace, an added separate afterburner following the scrubber, and an added high efficiency heat exchanger functionally located between the scrubber and afterburner for recovering heat from the afterburner gases to preheat the conditioned off-gases from the washer-cooler scrubber ahead of the afterburner. In Table 1, the first (left) column presents data from prior practice when the top hearth was employed only for sludge drying at 800° F. while the second column presents data from the same hearth used only as an afterburner at 1400° F. Columns 3 and 4 present anticipated data from the invention with the afterburner at 1500° F., but at different sludge throughout rates. A higher sludge capacity is enabled by the invention because the top hearth is always available for drying and less air is required in the furnace.

TABLE 1

Comparison of Conventional Design To Invention Design

| | Conventional Plant As Designed | | Plant Design Per Invention[1] | |
|---|---|---|---|---|
| | 800° F. | 1400° F. | 1500° F. | |
| Cake Feed-lb/hr | 22,000 | 22,000 | 22,000 | 28,900[4] |
| Cake Solids-lb/hr | 4,400 | 4,400 | 4,400 | 5,780 |
| Volatile Solids-lb/hr | 3,300 | 3,300 | 3,300 | 4,335 |
| Excess Air-% | 100 | 75[2] | 50 | 50 |
| Fuel Required-gph | 51.7 | 300.1 | 59.8 | 74.5 |
| Air Required: 10³ scfm | 13.3 | 21.4 | 10.3 | 13.5 |
| Scrubber Inlet Volume 10³ acfm | 49.7 | 99.8 | 59.8 | 78.5 |
| Scrubber Outlet Volume 10³ acfm | 15.1 | 24.2 | 11.6 | 15.2 |
| ID Fan Power-hp[3] | 137 | 220 | 110 | 140 |
| Gas Heat Content- 10⁶ Btu/hr | 40.0 | 73.5 | 41.1 | 54.0 |
| Scrubbing Water-gpd | 1300 | 2100 | 900 | 1200 |

[1]Based on 250° F. temperature differential in preheater and 100° F. saturated inlet gases.
[2]Afterburner excess air at 45%.
[3]Based on 35" $H_2O$ pressure drop across scrubber-cooler.
[4]Higher feed capacity based on 10.8 lb cake/ft²/hr and 2,674 ft² furnace area.

Savings are achieved by:

1. Fuel reduction from 300 to 60 gph (80% reduction) without taking any credit for the heating value of organics in the conditioned gases which would further reduce fuel requirements.
2. Furnace air requirements are reduced by 50%.
3. I.D. fan power is reduced by 50%, or 110 hp.
4. Scrubber water requirements are reduced by 55% or 1200 gpm due to lower BTU input to furnace.
5. Smaller ductwork and scrubber, pumps, etc., hence lower capital costs.
6. Flexibility to operate the afterburner at higher temperatures than 1400° F. without severe operating penalties.
7. Increase of over 30% in furnace capacity.

The cost of the afterburner, heat exchanger and related equipment will be quickly offset by the savings in fuel, added capacity, smaller equipment, reduced power and water and the like. Lower temperatures in the furnace will reduce the quantity of heavy metals which will be fumed. Fumed metals are objectionable because they will leave the furnace with the off-gases rather than be discharged with the ash as is desired. As fumes in the off-gases, the heavy metals, such as cadmium, chromium, lead, zinc and copper are very difficult to remove by conventional wet scrubbers.

Researchers have demonstrated that the majority of heavy metals can be prevented from fuming by keeping them below 1110° F.(600° C.). At 1470° F. (800° C.) in the sludge combustion zone of the conventional system as much as 80% of the cadmium, 50% of the lead, 10% of the copper, 40% of the zinc and 20% of the chromium was volatilized. Since the bed of solids and ash in a multiple hearth furnace is 200° F.–300° F. cooler than the gas, combustion of most of the organic vapors can still occur at 1200°–1400° F. without excessive fuming of heavy metals. Thus, a further benefit of this invention is the ability to minimize the temperature of combustion in the multiple hearth furnace thereby to minimize fuming of heavy metals. This will result in a dirty off-gas and low burnout of carbon in the ash, but this invention accomodates that. In short, if it is necessary to control heavy metal emissions, operation at reduced bed temperature can be readily implemented depending on the sludge characteristics.

Research has also indicated that minimum $NO_x$ is produced when the temperature of gases from the pyrolysis zone of a counter-flow furnace are at or below 1110° F. Operation according to the invention will result in such gases being maintained in the temperature range of 500° F.–1100° F.

A further improvement in the efficiency and effectiveness of operation according to the invention would be to preheat the afterburner combustion air to 800°–1200° F.

There are a number of thermally resistant organic compounds which are resistant to oxidation at the normal 1400° F.–1700° F. afterburner temperatures. To dispose of such wastes the Environmental Protection Agency has required afterburner temperatures up to 2000° F.–2200° F. Also, there are many hazardous wastes, such as chlorinated hydrocarbons, dioxin, chloroform, polyvinyl chloride and the like which will require elevated afterburner temperatures. Currently available materials of construction limit heat exchanger operations to about 1800° F. If the afterburner is above that temperature, then it will be necessary to quench the gases to cool them to accommodate the equipment limitations. This can be done by any convenient means such as injecting cool air or by use of a radiant heat exchanger or waste heat boiler.

In order that the invention may be more readily understood and carried into effect, reference is made to the accompanying drawings and the descriptions thereof which are offered by way of example only and not in limitation of the invention, the scope of which is defined by the appended claims, including equivalents embraced therein, rather than by any mere description.

Figure 1:
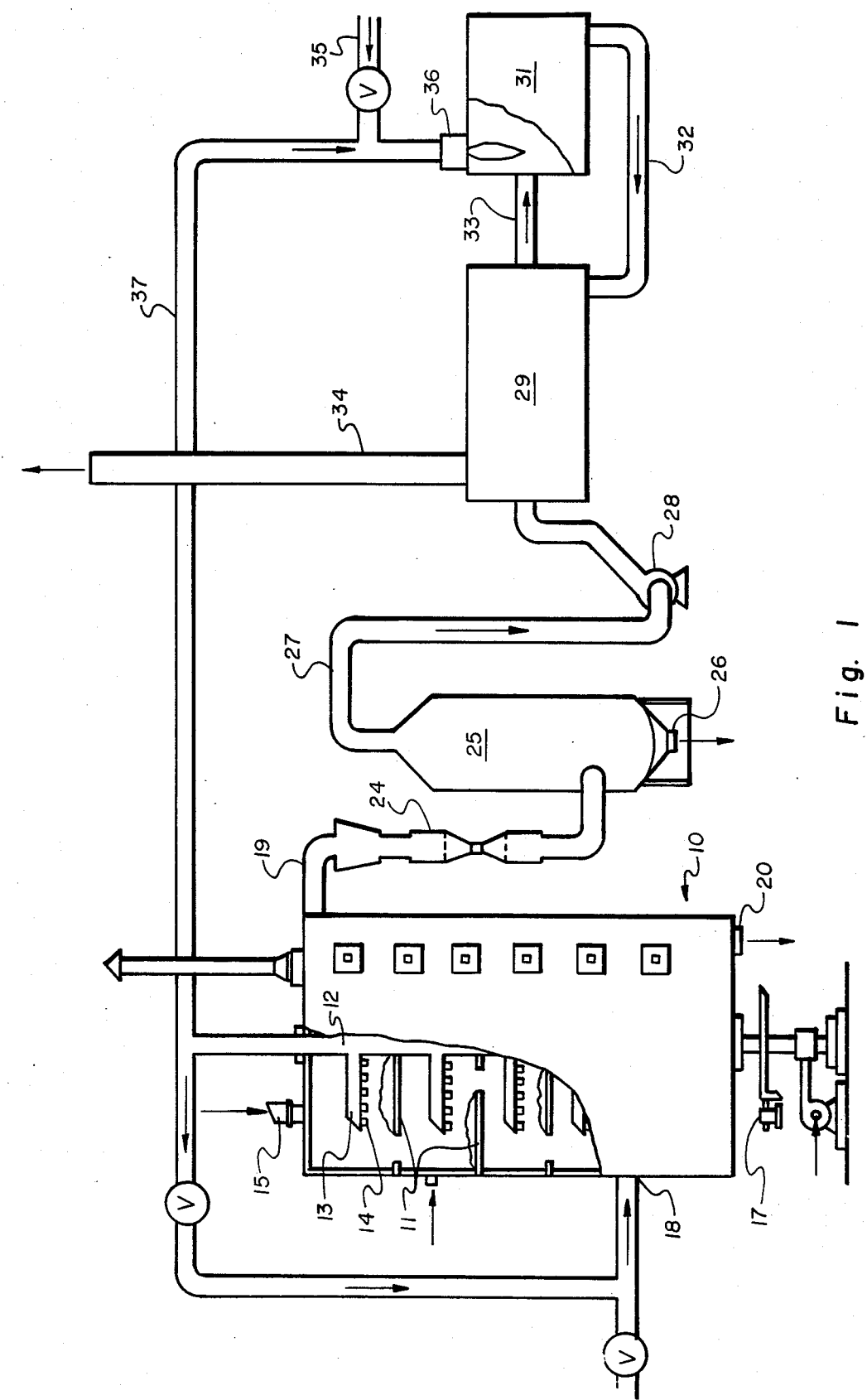
FIG. 1 is a diagramatic view of a system embodying the invention.
Figure 4:
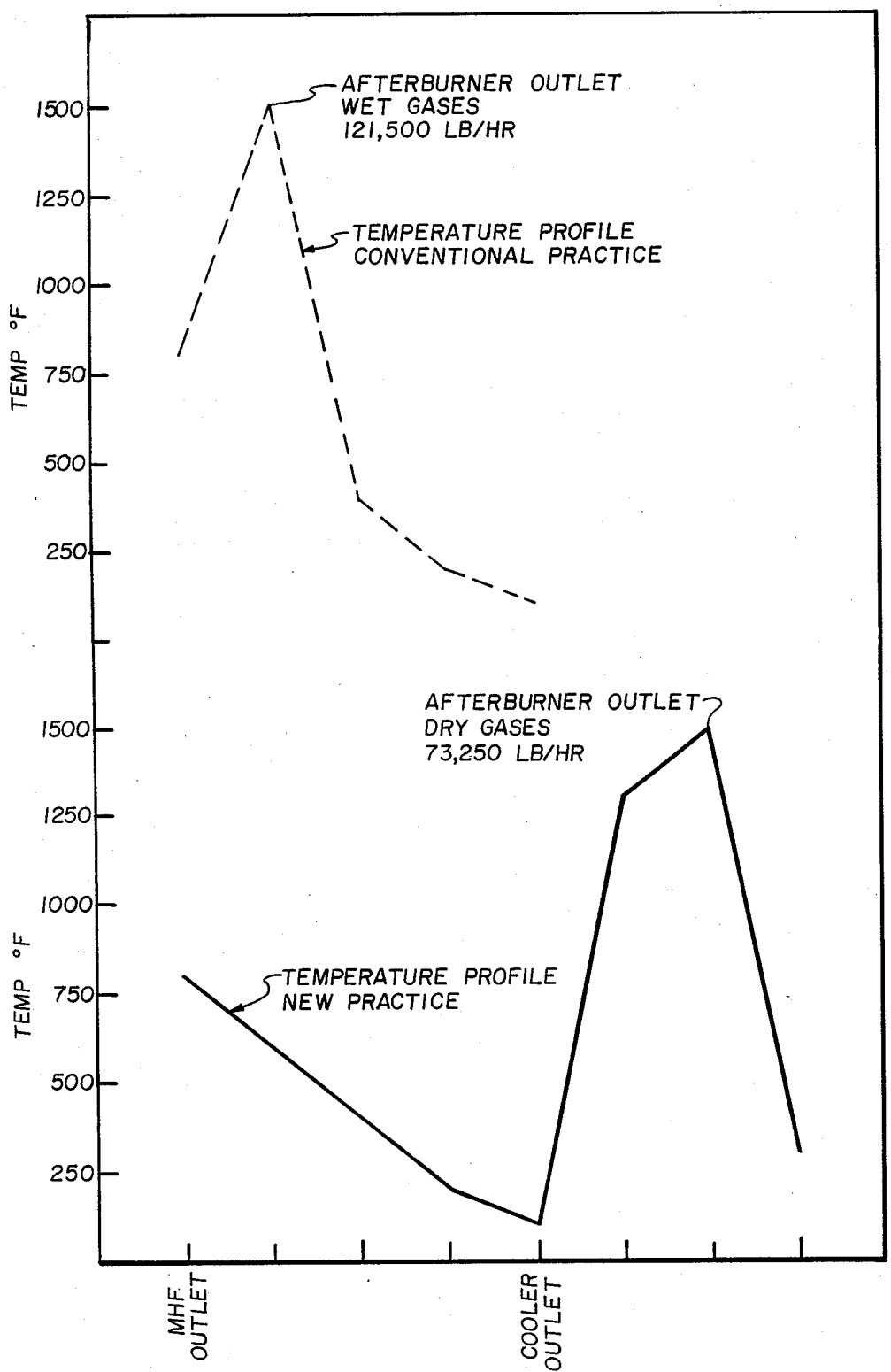

FIG. 4 is a graph depicting typical fuel savings to be achieved by this invention compared to a typical prior system. FIG. 1 illustrates the invention embodied in a system that employs a multiple hearth furnace. It comprises a furnace 10 with a plurality of vertically spaced hearths 11. A vertical hollow shaft 12 extends from below the furnace upwardly therethrough. The shaft has a plurality of hollow horizontal arms 13 extending therefrom over the respective hearths and from which depend rakes 14 for stirring solids thereon to cause them to cascade to successively lower hearths. The vertical shaft and rakes etc are rotated by a conventional drive 17. Air or other oxygen-bearing gas is introduced into a lower part of the furnace at appropriate points 18 to pass upwardly therethrough as sludge combustion proceeds thence to exit from the top through a suitable conduit 19. Auxiliary fuel and/or air is introduced through a suitable inlet. Wet sludge cake enters through a suitable inlet 15 at the top of the furnace while residual ashes exit through a suitable bottom outlet 20.

Off-gases exiting the drying zone of the top hearth are conducted by the conduit 19 into the cleaner-cooler system which includes venturi 24 and scrubber 25 whence the scrubber water discharges at 26 while the conditioned off-gases are conducted by means of a conduit 27 and induced draft fan 28 into a heat exchanger 29 where they are preheated by indirect contact with hot, clean gases conducted from the afterburner 31 via a conduit 32 to the heat exchanger 29. The preheated off-gases are conducted to the afterburner 31 by a conduit 33 while the now cooled afterburner discharge gases are released to the atmosphere via a suitable stack 34. Auxiliary fuel and/or combustion air supplied through valved conduit 35 are injected into the afterburner at 36. If furnace cooling air is used as combustion air in the afterburner, it is conveniently conducted from the furnace by conduit 37.

The wet scrubber portion of the system is designed to reduce the gas-entrained particulates to the concentrations required by the various regulatory agencies. This stage will also remove contaminants such as chlorides, sulfates and other fumes or vaporous compounds detrimental to the heat exchanger while condensing moisture from the gases. The conditioned off-gases leaving this stage will be at a temperature in the range from 80° F. to 120° F., will contain very little moisture (90% having been removed in scrubber), but will still contain hydrocarbons, organic fumes and complex organic compounds such as dioxins, aldehydes, chloroform, etc, and fixed carbon (soot) requiring removal. Since these conditioned off-gases are free from particulates and essentially dry they are adapted to use in a high efficiency heat exchanger. Thus, in accordance with this invention, they are conducted to a heat exchanger through which they flow in counter-current indirect heat exchange relationship to the hot gases from the afterburner. In this connection, it will be noted that the hot gases from the afterburner are essentially product gases. They are clean and specifically adapted for use in high efficiency heat exchangers for cooling prior to discharge to atmosphere. This contrasts with prior practice wherein the off-gases are not scrubbed until after they have been through the afterburner.

The preheated conditioned off-gases leave the heat exchanger at a temperature of 1400° F.–1700° F. (In fact, as high as 2200° F. for thermally resistant organics.) Depending on the design of the preheater, these gases may be preheated to within 150° F. of the temperature of the afterburner exhaust gases. Low differential temperatures are possible in regenerative types of heat exchangers the use of which is enabled by this invention.

The preheated gases are fed into a high temperature (1400° F. to 1700° F.) afterburner 31 wherein they are retained for 1 to 3 seconds thereby to reduce the contaminants to an acceptable level for discharge. Hot gases from the afterburner will flow thru the preheater to be finally discharged therefrom at a relatively low temperature of 200° F. to 350° F. Because the gases are essentially dry and warm, no visible discharge or plume will result from their release to the atmosphere.

Combustion air to the afterburner can be either ambient or cooling air exiting the furnace. The latter is economic since it has been preheated to about 400° F. to 450° F. from cooling the furnace center column and rabble arms. If desired, this incoming air can be preheated by heat exchange with afterburner discharge gases.

Since a high efficiency heat-exchanger preheater can be designed to maintain a specific differential temperature between afterburner exhaust and incoming preheated off-gases there would be only nominal added fuel usage to heat the afterburner exhaust gases temperature to 1400°, 1500°, or even above 1700° F.

As shown in the FIG. 1 embodiment, the heat exchanger 29 is a single compartment single function unit in which conditioned off-gases enter at one end to flow uninteruptedly therethrough to exit the other end enroute to the afterburner. Only the conditioned off-gases go through the exchanger in indirect exchange relationship to the counter-flowing afterburner exhaust gases.

Figure 2:
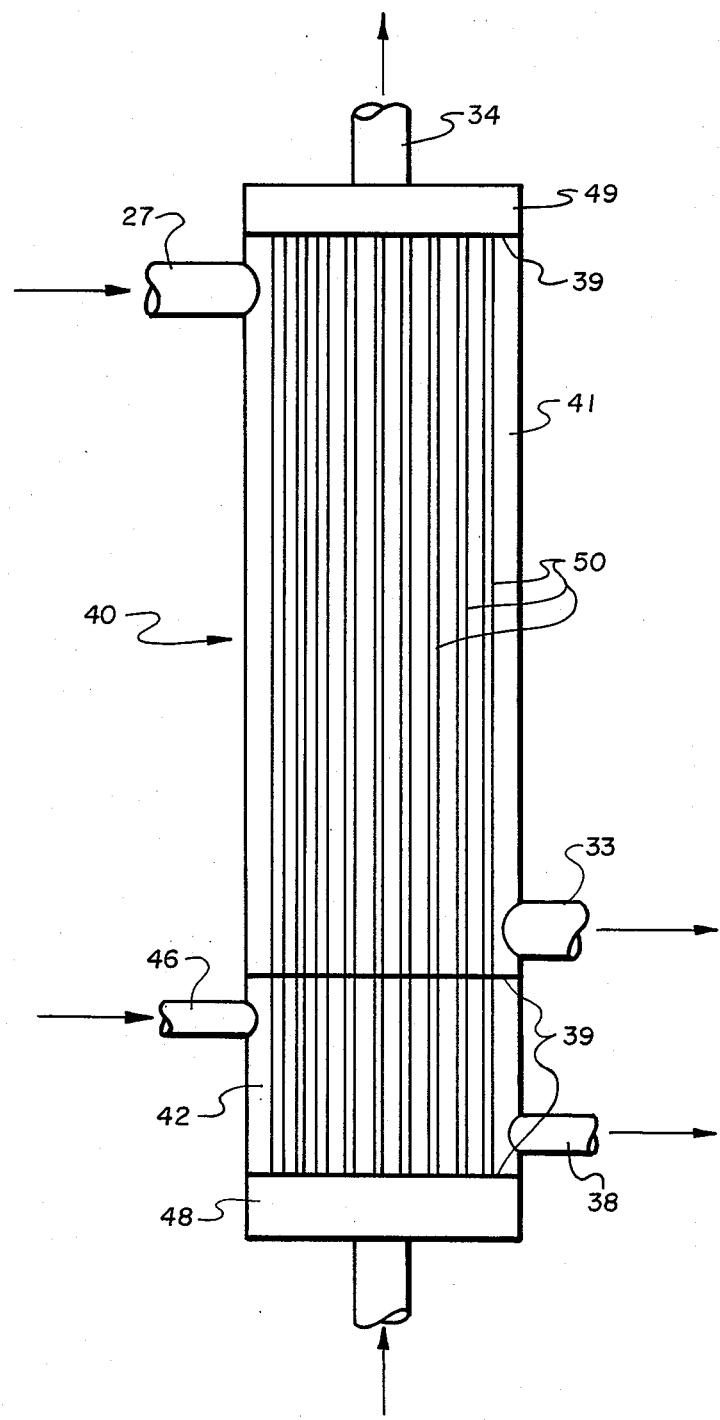
FIG. 2 is a simplified sectional view of a unique dual function heat exchanger for gas-to-gas heat transfer enabling achievement of specific advantages of the invention.

The invention contemplates preheating incoming afterburner combustion air for economy and enhanced burner operation. To enable efficient use of the afterburner gases for preheating both the off-gases and the incoming afterburner combustion air, the apparatus invention hereof includes a special heat exchanger diagramatically illustrated in FIG. 2. It may be characterized as a dual function heat exchanger. As shown in FIG. 2, the heat exchanger comprises an elongated housing 40 divided by two transverse walls 39 into a major or first compartment 41 and a minor or second compartment 42. Cool conditioned off-gases from the scrubber are carried by the conduit 27 (FIG. 1) to the inlet of the major compartment then pass through the interior thereof to the opposite end outlet therefrom adjacent the minor compartment whence they discharge to be carried via a conduit 33 (FIG. 1) to the afterburner 31. Combustion air to be preheated is introduced by a suitable conduit 46 which may be a branch from conduit 37 (FIG. 1). Preheated combustion air exits the minor compartment via a conduit 38 which conducts it to the afterburner combustion air inlet 36. The heat exchanger includes plenums 48 and 49 at its opposite ends which are connected by a plurality of gas-carrying heat exchange tubes 50. Afterburner exit gases are conducted by conduit 32 (FIG. 1) to the plenum 48 adjacent the minor compartment whence they flow through the tubes to the opposite end plenum 49 then discharge to the stack 34 (FIG. 1). The heat exchange compartments are sized to accomodate anticipated gas flow and temperature goals. In both compartments, the gases to be heated are the matrix while the heating gases are in the tubes. The construction provides an efficient way of using a single gas source to heat or be heated by two separate gas streams in a single piece of equipment. Although the method invention hereof can be practiced with two separate exchangers, in the peculiar environment of the method invention, unusual economy of operation will be achieved by use of the dual function exchanger. In other words, two separate exchangers and the dual function exchanger of the invention are not mechanically equivalent, although they do perform the function of preheating two gas streams. The two stage unit of the invention is more compact and more efficient. It may be readily installed into existing systems.

Figure 3:
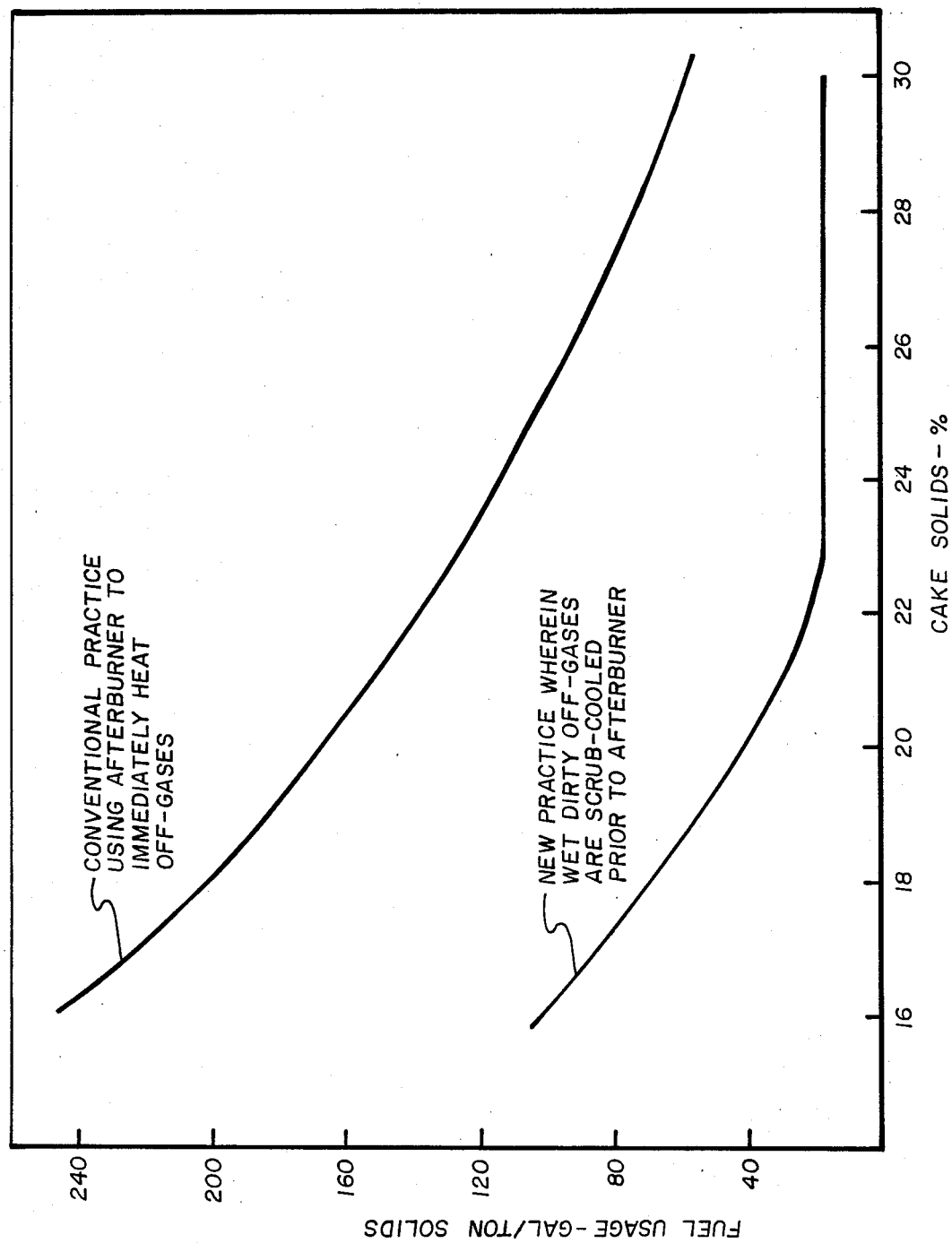
FIG. 3 is a graph that contrasts the temperature profile of a gas stream produced by practice of this invention with that produced from prior practice.

FIG. 3 illustrates graphically typical savings in auxiliary fuel achievable by modification of an existing prior system to practice the invention.

The upper curve is based on data obtained from the same existing system as were the data in Table 1. The lower curve is based on calculations assuming modification of the system according to the invention.

FIG. 4 compares the temperature profile of off-gases from a prior system like that described in connection with Table 1 with the anticipated temperature profile of the off-gases from the same system practicing the new invention. The upper curve is according to prior practice. It follows the temperature of the off-gases beginning at the final drying hearth of the furnace through the immediate afterburning to high temperature then cooling. The lower curve follows the temperature of off-gases in the new system. The gases start at the same drying hearth, but instead of being heated are immediately cooled and cleaned. Thereafter, they are preheated by heat exchange and finally heated by afterburning to the maximum temperature. It is noteworthy that in the prior practice there are 121,500 lbs/hr of off-gases to be handled in the afterburner whereas in the new practice the load on the afterburner is reduced to 73,250 lbs/hr of gases.

Having thus described our invention and the preferred mode of carrying it out, the protection we desire to secure by Letters Parent is defined in the following claims and the equivalents embraced therein.

We claim:

1. The method for waste sludge incineration comprising the steps of moving sludge through a thermal treatment zone counter-currently to the flow therethrough of off-gases from said treatment zone while maintaining conditions in said treatment zone sequentially to dry then combust said sludge thereby to yield and discharge as separate products solid residue and said off-gases which off-gases contain particulates as well as vapors of water and other materials and are at a temperature in the range from about 500° F. to about 1100° F.; washing and cooling substantially all of said off-gases to yield conditioned off-gases that are substantially free from particulates and condensibles and are at a temperature in the range from about 80° F. to about 120° F.; introducing said conditioned off-gases into an afterburner zone; burning fuel in combustion supporting gases in said afterburner zone; retaining said conditioned off-gases with said burning fuel in said afterburner zone to produce hot fully treated off-gases that are at a temperature between about 1400° F. and 2200° F.; flowing said hot fully treated off-gases and said conditioned off-gases through a heat exchange zone before said conditioned off-gases are heated in said afterburner zone thereby to preheat said conditioned off-gases while cooling said fully treated off-gases; and discharging said fully treated off-gases.

2. The method according to claim 1 in which conditions in said thermal treatment zone are controlled to maintain the sludge solids and solids residue therein at a temperature below about 1500° F. whereby to limit fuming of heavy metals contained in said sludge.

3. Apparatus for sludge incineration comprising in series the following components in the order stated; a counter-flow furnace having separate outlets for solid residue and off-gases, a separate inlet and outlet for furnace cooling air, an off-gas scrubber and cooler, a heat exchanger of the type in which gases at different temperatures flow counter-currently in indirect heat exchange relationship and comprising two separate heat exchange compartments arranged to permit flow of a single gas stream serially through both of said compartments, first branch conduit means connected to conduct the off-gases from said off-gas scrubber and cooler to a first one of said heat exchange compartments and therefrom to said afterburner, and second branch conduit means connected to conduct gases from said furnace cooling air outlet to said second one of said heat exchange compartments and therefrom to said afterburner, an afterburner, gas flow guidance means functionally connecting said components so that off-gases from said furnace are guided to flow without interruption sequentially through said components, conduit means for conducting gases from said afterburner to said heat exchanger, and final outlet means including a stack to release afterburner gases from said heat exchanger.

4. The method for waste sludge incineration comprising the steps of moving sludge through a thermal treatment zone counter-currently to the flow therethrough of off-gases from said treatment zone; supplying to said thermal treatment zone combustion supporting gases in an amount to provide excess free oxygen in an amount not exceeding about 75% of that stoichiometrically required to oxidize substantially all of the carbon, oxygen and sulfur in the sludge supplied to said treatment zone to carbon dioxide, water and sulfur dioxide; maintaining conditions in said treatment zone sequentially to dry then combust said sludge thereby to yield and discharge as separate products solid residue and said off-gases which off-gases contain particulates as well as vapors of water and other materials and are at a temperature in the range from about 500° F. to about 1100° F.; washing and cooling said off-gases to yield conditioned off-gases that are substantially free from particulates and condensibles and are at a temperature in the range of from about 80° F. to about 120° F.; introducing said conditioned off-gases into an afterburner zone; burning fuel in combustion supporting gases in said afterburner zone; retaining said conditioned off-gases with said burning fuel in said afterburner zone to produce hot fully treated off-gases that are at a temperature between about 1400° F. and 2200° F.; flowing said hot fully treated off-gases and said conditioned off-gases through a heat exchange zone before said conditioned off-gases are heated in said afterburner zone thereby to preheat said conditioned off-gases while cooling said fully treated off-gases; and discharging said fully treated off-gases.

5. The method for waste sludge incineration comprising the steps of moving sludge through a thermal treatment zone counter-currently to the flow therethrough of off-gases from said treatment zone while maintaining conditions in said treatment zone sequentially to dry then combust said sludge thereby to yield and discharge as separate products solid residue and said off-gases which off-gases contain particulates as well as vapors of water and other materials and are at a temperature in the range from about 500° F. to about 1100° F; washing and cooling said off-gases to yield conditioned off-gases that are substantially free from particulates and condensibles and are at a temperature in the range from about 80° F. to about 120° F.; introducing combustion supporting gases and said conditioned off-gases into an afterburner zone at a rate sufficient to provide in said zone excess free oxygen in amount of about thirty percent to about seventy five percent of that stoichiometrically required to oxidize all fuel and other oxidizable constituents supplied to said zone with said combustion supporting gases and said off-gases; burning fuel in combustion supporting gases in said afterburner zone; retaining said conditioned off-gases with said burning fuel in said afterburner zone to produce hot fully treated off-gases that are at a temperature between about 1400° F. and 2200° F.; flowing said hot fully treated off-gases and said conditioned off-gases through a heat exchange zone before said conditioned off-gases are heated in said afterburner zone thereby to preheat said conditioned off-gases while cooling said fully treated off-gases; and discharging said fully treated off-gases.

6. The method for waste sludge incineration comprising the steps of moving sludge through a thermal treatment zone counter-currently to the flow therethrough of off-gases from said treatment zone while maintaining conditions in said treatment zone sequentially to dry then combust said sludge thereby to yield and discharge as separate products solid residue and said off-gases which off-gases contain particulates as well as vapors of water and other materials and are at a temperature in the range from about 500° F. to about 1100° F.; washing and cooling said off-gases to yield conditioned off-gases that are substantially free from particulate and condensibles and are at a temperature in the range from about 80° F. to about 120° F.; introducing combustion supporting gases and said conditioned off-gases into an afterburner zone; burning fuel in combustion supporting gases in said afterburning zone; retaining said conditioned off-gases with said burning fuel in said afterburner zone to produce hot fully treated off-gases that are at a temperature between about 1400° F. and 2200° F.; flowing said hot fully treated off-gases in indirect heat-exchange relationship with said combustion supporting gases and said conditioned off-gases through a heat exchange zone before said combustion supporting gases and conditioned off-gases are heated in said afterburner zone thereby to preheat said combustion supporting gases and conditioned off-gases while cooling said fully treated off-gases; and discharging said fully treated off-gases.

* * * * *